United States Patent Office 3,168,731
Patented Feb. 2, 1965

3,168,731
CROSS-BAND BEACON
Lionel Shub, Buffalo, and Richard B. Rupp, Lockport, N.Y., assignors to Bell Aerospace Corporation, Wheatfield, N.Y.
Filed Aug. 21, 1961, Ser. No. 132,770
21 Claims. (Cl. 343—6.8)

This invention relates to beacon transponders especially useful aboard aircraft for enhancing signal reflections in automatic landing systems employing radar located on the ground, and more particularly, this invention relates to a novel airborne cross-band beacon to be interrogated by the ground radar pulses in such fashion that the signals received by the target are amplitude modulated in accord with the angular position of the target, and said beacon then responding to each interrogating pulse by transmitting back a signal on a different band, which signal has been modulated in direct proportion to the amplitude of the received interrogating pulse.

It is well known that by imparting a conical scanning motion to an interrogating radar antenna, the interrogating pulses received or reflected by a target will be amplitude modulated as a result of the scanning motion; such modulation being sinusoidal and at the scanning frequency. As used herein, the term "pulse amplitude scan modulation" refers to this effect.

It is a principal object of this invention to provide an airborne beacon capable of extending the useful range of automatic landing systems especially under adverse conditions of atmospheric attenuation.

Another principal object of the invention is to provide a highly dependable beacon permitting both range and angle tracking with a high degree of accuracy.

Still a further principal object of this invention is to provide a beacon especially designed to avoid mixing of radar signals if the beacon should become illuminated by more than one landing radar. Because of the possibility that the beacon might occasionally be illuminated by more than one landing radar and since these radars would be close together, the signals received by the beacon from the two radars would be about the same amplitude. To prevent mixing of the two pulse amplitude scan-modulation voltages within the beacon, a pulse time modulation system is used wherein the amplitude of the received pulse is read out within five microseconds after its arrival, and the circuit is then immediately reset. The beacon response consists of two pulses, the first occurring when the interrogation pulse is received, and the second at a time delay of from two to five microseconds later, the delay being proportional to the amplitude of the interrogation pulse.

It is a more specific object of the invention to provide a transponder-type beacon to be illuminated by radiation on one frequency band and to reply on another frequency band, wherein the pulse amplitude scan modulation on the illuminating radar signal is detected and converted into pulse-position modulation on the reply signal, the latter type of modulation being transmitted by pairs of pulses, the first pulse in each pair being initiated immediately after the arrival of the interrogating radar pulse, and the second pulse in each pair being initiated after a delay proportional to the amplitude of that particular illuminating radar pulse as compared with the average amplitude of all of the pulse amplitude scan-modulated radar pulses. A practical embodiment of this beacon receives pulses on Ka band and transmits replies on a convenient lower band, namely on S-band.

A further object of this invention is to provide a beacon having sufficient sensitivity to detect the interrogation pulse and having sufficient band width to avoid distortion of the shape of said pulse, and in addition to provide a beacon-transponder which assists the obtaining of aircraft angle information by avoiding interfering image reflections, this object being attained, especially for tracking at lower elevation angles by the use of a radar with narrow antenna beams such as can be obtained at microwave frequencies with an antenna of relatively small size.

On the ground, the output of the beacon transponder can be received by one of a number of different standard equipments, for instance, including a horn fed to a superheterodyne receiver. The detected video from the transponder output can then be sent to a range tracker and scan-modulation detector, the latter transforming the pulse-position information into a sine wave signal at the conical scan frequency of the ground antenna, and feeding this signal to an angle tracker. The details of the ground equipment form no part of the present invention and are therefore not further described in this specification.

It is another specific object of this invention to provide in a becon of the general type described above a novel video pulse amplifier having a very efficient automatic gain control which, once the received pulse exceeds a certain minimum amplitude, adjusts the gain of the video amplifier to maintain the average amplitude of the output video pulses constant so that the actual output amplitude of the individual pulses will be exactly proportional to the instantaneous position of the scanning antenna, independent of the signal strength of the received radar signal.

Another important object of the invention is to provide an automatic gain control system in the transponder having a long time constant, i.e. about three seconds, so that the transponder remembers the strongest illumination signal during the landing radar search cycle, this feature preventing the beacon from being triggered by side-lobe illumination on the succeeding acquisition cycle. Thus, about ten pulses are required to build up the automatic gain control voltage, so that the receiver gain cannot be reduced by spurious noise or by changes in the instantaneous amplitudes of successive pulses.

Still a further specific object of the invention is to provide a novel circuit for converting the scan modulation, received in the form of pulse-amplitude modulation, into scan modulation in the form of pulse-position modulation for transmission back to the ground system for the accurate determination of range and angle of the airborne beacon, and the transponder signal being essentially free of variations in time delay between received and transmitted pulses as well as free of pulse jitter.

Other objects and advantages of the invention will become apparent during the following discussion of the drawings, wherein.

Figure 1:
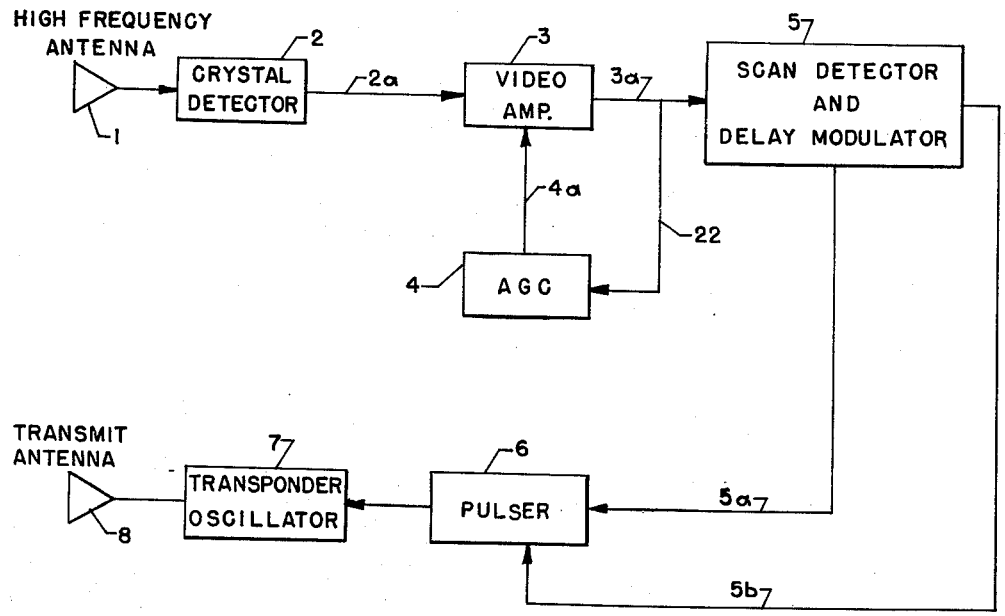
FIG. 1 is a block diagram illustrating in broad terms a transponder according to the invention.

Referring now in greater detail to the drawings, and in particular to FIG. 1, the cross-band beacon includes a high-frequency antenna suitable for receiving the type of radar pulses emanating from the ground station, the antenna being designated by the reference numeral 1 and preferably being a flush-mounted antenna designed to accept circular polarization. This antenna receives the pulses from the ground radar which are amplitude modulated in accord with the scanning motion of the ground antenna and delivers these pulses to an ordinary crystal detector 2 which detects the radio frequency pulse signals and delivers unidirectional pulses (i.e. either positive or negative) having envelopes which are the same shape as the envelopes of the received radar pulses. As stated above, these pulses will be amplitude modulated from pulse to pulse according to the scanning motion applied to the radar antenna at the ground station in a manner well know per se, this equipment forming no part of the present invention. The detected amplitude modulated pulses are then delivered to a video amplifier 3 the gain of which is controlled by an automatic gain control circuit 4 so that the average amplitude of the series of pulses received remains constant, whereby each individual pulse can be made to assume an instantaneous amplitude proportional to the instantaneous position of the scanning antenna in the radar set on the ground. As a result, assuming that the pulses received from the radar are of great enough amplitude to actuate the automatic gain control, which amplitude establishes a minimum threshold level necessary for proper operation of the cross-band beacon, a train of pulses will then be delivered by the video amplifier to the scan detector and delay modulator 5, to be described in greater detail hereinafter in connection with FIG. 3. For purposes of considering the broad aspects of the present system it suffices to state that the output of the scanning detector and delay modulator 5 comprises two pulses one of which is immediately delivered to the pulser 6 which then triggers the oscillator 7 to deliver an RF response pulse to the antenna 8 for radiation back to the ground radar, and the other pulse being delivered from the delay modulator to the pulser 6 after a delay proportional to the amplitude of the pulse just delivered from the video amplifier 3 to the scanning detector 5. In other words, the delay between each two pulses that are delivered by the circuit 5 to the modulator 6 depends entirely upon the instantaneous amplitude of the latest scan-modulated pulse from the video amplifier. Thus the transponder oscillator 7 transmits back two pulses to the ground radar for every pulse received in the video amplifier 3 and passed on to the scan detector 5. The first of these two pulses is transmitted immediately upon receipt of a radar pulse and is used by the ground radar for determining the range of the cross-band beacon. The second pulse then comes along a few microseconds later, and the amount of this delay is then transformed at the ground radar back into the original scan sine wave in a manner known in the prior art to recover the scanning frequency initially amplitude modulated on the outgoing radar pulse, and now received back as position modulation of the second pulse in each group of two pulses.

Figure 2:
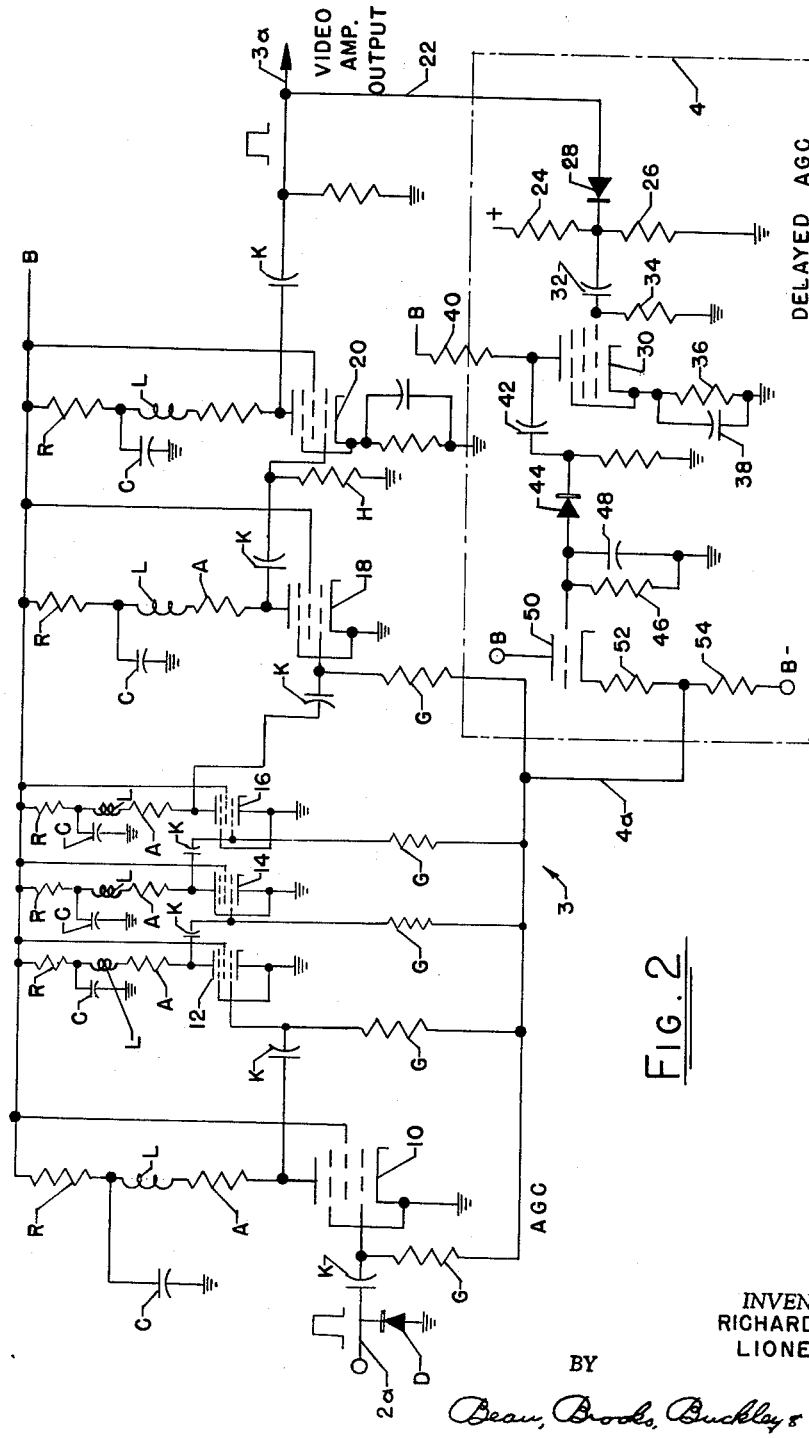
FIG. 2 is a schematic diagram illustrating in detail the video amplifier and automatic gain control circuits represented as boxes in FIG. 1.

Referring now to FIG. 2, this figure comprises a plurality of similar video amplifier stages including in each case a remote cut-off pentode, these pentodes bearing the reference numerals 10, 12, 14, 16, 18 and 20, and these six stages each having in its anode circuit a video peaking coil L, a decoupling condenser C, a decoupling resistor R connected with the B-plus line, and an anode resistor A. All of these video amplifiers are well known in the prior art and are not unusual, the amplifiers being substantially similar except that the first five stages 10 through 18 inclusive have automatic gain control voltages applied to their control grids through a decoupling resistor G whereas the sixth stage has its control grid returned to ground through a resistor H, and therefore the gain of this stage is not controlled by the automatic gain control voltage, the derivation of which will be hereinafter explained in connection with the schematic diagram of the automatic gain control circuit also illustrated in FIG. 2. The pulse signals are coupled to the input of each of the stages by a coupling capacitor K, and similar capacitors are employed to apply the input signal to the control grid of the first amplifier stage 10 and to conduct the output from the anode of the last amplifier stage 20 into the subsequent circuits. The signal delivered from the crystal detector 2 appearing in FIG. 1 is delivered along a wire 2a into the first coupling condenser K, and a diode D is connected in shunt between the line 2a and ground to prevent negative overshoot of the trailing edge of the pulse and to retain the pulse substantially rectangular.

This video amplifier is required to give linear pulse reproduction over a dynamic range of input signals of at least 80 db. This is necessary for faithful reproduction of the scan modulation voltage and can be accomplished by the six remote cut-off pentode amplifiers as illustrated in FIG. 2. As stated above, a delayed automatic gain control voltage is furnished to the grids of all except the final stage 20 and this automatic gain control is obtained from a circuit located within the dashed box labeled 4 in FIG. 2. The output signal from the last video stage 20 through its coupling capacitor K comprises a positive pulse which is delivered along the line 22 to the automatic gain control circuit in the box 4. The voltage divider comprising the resistors 24 and 26 is provided between B-plus and ground, and the junction between these two resistors is coupled to the output of the video amplifier 3 by a diode 28, this diode together with the resistors 24 and 26 comprises a gate circuit establishing a threshold minimum amplitude of the positive pulse at the output of the video amplifier 3 required to apply a positive voltage to the control grid of a pentode 30, this grid being connected to the diode 28 by a capacitor 32, and the grid being returned to ground through a resistance 34. Self-biasing of the pentode 30 is provided by the resistor 36 and the capacitor 38, and the load resistor 40 connects with the anode of the pentode to B-plus. Suitable screen bias for the pentode 30 has been omitted from the schematic drawing since it is conventional. The pentode 30 as connected in this diagram comprises a pulse amplifier which amplifies that component of each output pulse which exceeds the threshold established by the gate 24–26–28 and therefore negative pulses can be taken from the anode of the pentode 30 through the condenser 42 and applied through the diode 44 to a leaky integrator circuit including a resistor 46 and a capacitor 48 which establish also the time constant of the delayed automatic gain control. This integrated group of negative pulses biases the cathode follower triode 50 to a level somewhere in the vicinity of ground potential, or therebelow, the triode 50 being connected in series with a resistance voltage divided 52–54 and between B-plus and B-minus, which latter voltage is below ground potential. Thus, the automatic gain control voltage appears on a line 4a which then enters the video amplifier and controls its gain so as to maintain the average output level of the positive pulse from the amplifier 3 constant.

The purpose of the delayed AGC is primarily to suppress response from the beacon target while the target is subjected to side lobe illumination from the transmitting ground antenna. In this connection, it will be obvious that the target may well be positioned initially such that, during a scanning cycle, it will be illuminated by the main lobe only during a part of such cycle and only by a side lobe during a remaining portion of the cycle. By making the time constant of the AGC sufficiently long (i.e. about three seconds), the video amplifier output pulser will be of such small amplitude during that portion of the scanning cycle during which only side lobe illumination is occurring, that such pulses will be ineffective to initiate beacon response, as will hereinafter appear. Instead, the much greater average amplitude of pulses (although varying from pulse to pulse) received during that portion of the scanning cycle in which main lobe illumination is occurring, will cause the video amplifier to adjust its gain to this much greater average amplitude and to retain this adjustment for a sufficiently long time so that its output during only side lobe illumination will be of the aforesaid small amplitude insufficient to cause response. At the same time, the AGC adjusts to the strongest signal (main lobe illumination)

such as to produce output pulses having sufficient amplitude to cause response. However, this same delayed action of the AGC (long time constant) adjusts only to the average amplitude of the strongest signals and does not prevent the amplitude modulation of the output pulses from manifesting itself at the output of the video amplifier 3.

Figure 3:
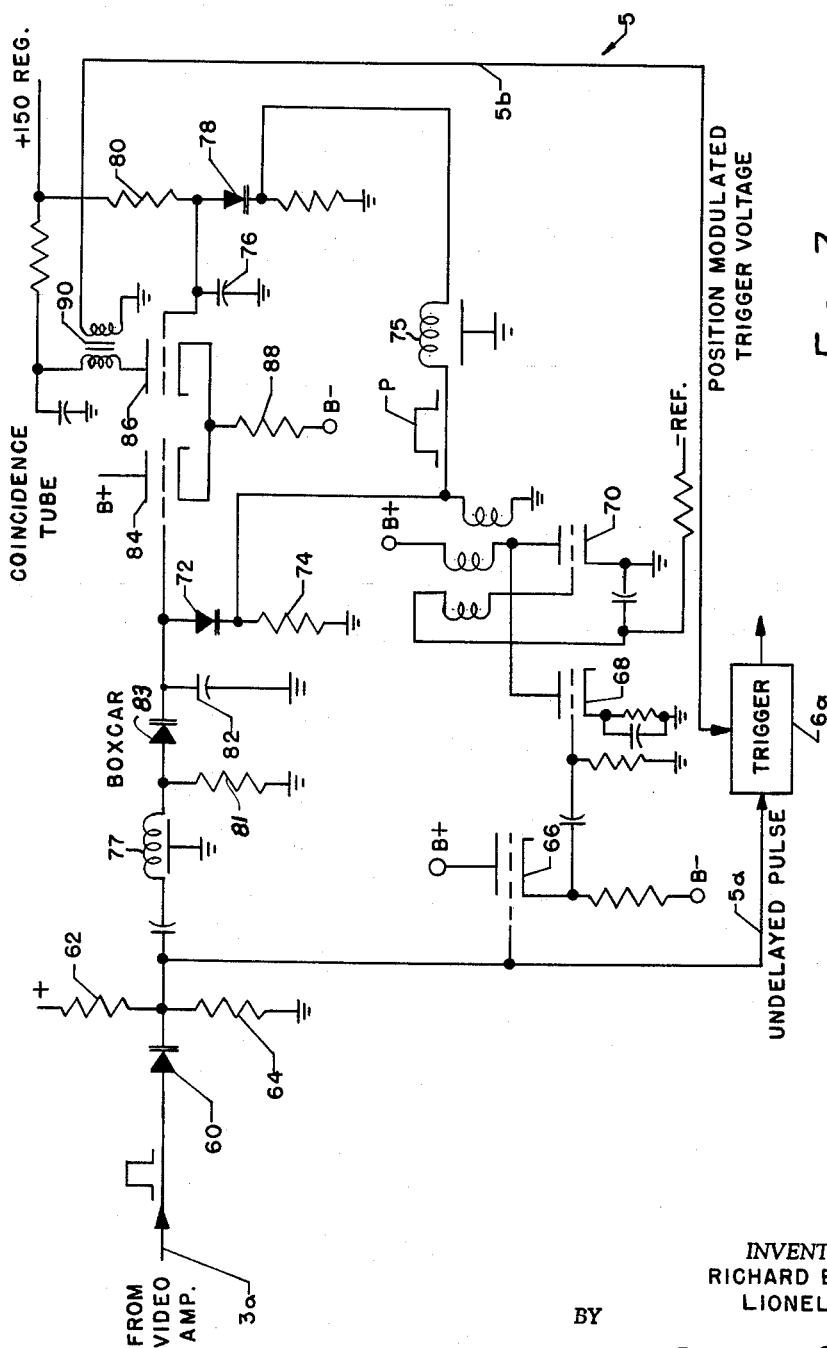
FIG. 3 is a schematic diagram illustrating a specific embodiment of the scan-detector and delay modulator illustrated generally by a box in FIG. 1.

Referring now to FIG. 3, this schematic diagram illustrates the content of the box 5 in FIG. 1 and shows a standard circuit for the scan detector and delay modulator which modulates the amount of delay between the first pulse and the second pulse delivered by the transmitter oscillator 7. The output along the line 3a from the video amplifier 3, as stated above, comprises positive pulses and average amplitude is maintained constant by the automatic gain control circuit but whose instantaneous amplitudes vary according to the percentage scan modulation. These positive pulses are applied through a crystal diode 60 whose cathode is biased somewhat positive by a voltage divider 62, 64 for the purpose of excluding small-amplitude signals passing through the video amplifier originating from side lobe illumination by the landing radar, or by other spurious sources. This video pulse passing through the diode 60 is applied immediately through the lead 5a to a trigger 6a which forms a part of the pulser 6 and which operates in a manner to be described in connection with FIG. 4 to immediately initiate the first of said pairs of pulses to be transmitted by the oscillator 7 via the antenna 8. This is the pulse which is used by the ground radar for range tracking of the position of the transponder. This initial pulse is also transmitted through amplifier tube 66 to a blocking oscillator, another amplifier 68 serving to sharpen the pulse for the purpose of triggering the blocking oscillator 70. This blocking oscillator produces a seven microsecond pulse P illustrated in FIG. 3, these pulses initiating the pulse-position modulation cycle of the present disclosure. The pulse P from this blocking oscillator 70 actuates a boxcar circuit by opening the discharge path through a crystal diode 72 which is returned to ground by a resistor 74. Also, the pulse P is applied through a delay line 75 to initiate after a brief delay the building up of a sawtooth voltage across the capacitor 76 as the delayed pulse opens the discharge path through the crystal diode 78. The time constant of the capacitor 76 and the resistor 80 is about 50 microseconds.

The video pulse entering through the diode 60 is passed through a delay line 77 so that it is admitted to the boxcar circuit at about the time the capacitor 76 begins to charge up, and charges the capacitor 82 to the peak value of the pulse, and this voltage across the capacitor 82 is applied to the control grid of the first triode section 84 the cathode of which is coupled with the cathode of a second triode section 86 and is returned to B-minus by way of a resistance 88. The two tube sections 84 and 86 serve as coincidence tubes in which initially the triode section 86 is cut off entirely by the presence of the input pulse to the triode 84, which biases this triode strongly forward and thereby biases the second stage to cut-off since the cathodes are coupled together. However, after the section 86 is initially cut off by the pulse on the grid of the section 84, the sawtooth voltage begins to rise across the capacitor 76, and this rise continues until the voltage on the grid of the triode 86 passes through its cut-off value and thereby biases this amplifier on. The tube 86 at this point suddenly conducts and delivers a sharp pulse through the transformer 90 in its anode circuit and through the wire 5b to the trigger 6a. This pulse then initiates another triggering of the oscillator 7 by the trigger circuit 6a in a manner to be presently described in connection with FIG. 4 and this second pulse then comprises the second pulse in said pair of pulses. This second pulse is delayed from the time of the first pulse by the length of time required for the sawtooth voltage to build up across the capacitor 76 to the level of the particular input established by the amplitude of the particular pulse applied to the grid of the tube 84 through the input diode and the boxcar circuit after charging the capacitor 82.

The boxcar circuit is a circuit which when actuated by a delayed input pulse generates a long-duration pulse whose amplitude is equal to the amplitude of the input pulse. The blocking oscillator 70 produces a 7 microsecond pulse which is applied without delay to the cathode of diode 72 to block the latter and close its discharge path for capacitor 82. Thus the input video pulse, after a short delay to insure that diode 72 is blocked, charges capacitor 82 to the value of the pulse peak. This voltage is held until the discharge path through diode 72 and resistor 74 is again completed after the pulse P passes.

Figure 4:
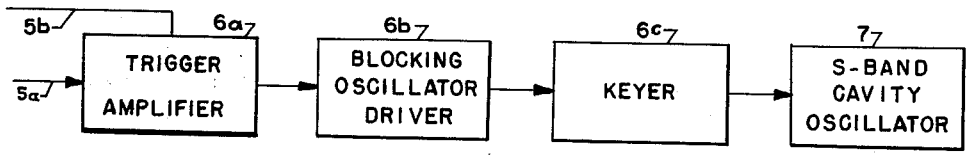
FIG. 4 is a block diagram illustrating in greater detail the units employed to make up the pulser and transponder oscillator portions of the block diagram of FIG. 1.

Referring now to the block diagram of FIG. 4, the two pulses delivered by the scan detector and delay modulator through the lines 5a and 5b are applied to the trigger amplifier 6a which then delivers a sharp trigger to a driver 6b which in turn drives a high voltage pulser 6c which finally pulses an S-band output of duration equal to the length of time that the pulser is on the air, presumably 0.2 microsecond. This RF output can be obtained from a triode oscillator, a peak power output of 100 watts being quite adequate for present transponder purposes, but being well below the maximum ratings for a tube of this type. The oscillator 7 is preferably a plate-pulser circuit driven by a pulse forming network in the pulser 6c. Preferably, a hard vacuum tube is employed for modulating the oscillator 7 and this tube is driven by a block oscillator comprising the driver which oscillator furnishes a high amplitude pulse having a fast rise time and correct width of 0.2 milisecond.

The following table gives a list of values suitable for making a practical working embodiment of the present invention:

| | |
|---|---|
| Diodes D, 28, 44, 60, 72, 78 and 83 | 1N658 |
| Capacitors K _____microfarad__ | 0.1 |
| Resistors A _____ohms__ | 1,500 |
| Inductances L _____microhenrys__ | 8 |
| Resistances R _____ohms__ | 10,000 |
| Capacitors C _____microfarad__ | 1 |
| Tubes 10, 12, 14, 16, 18, 20 and 30 | 6BA6 |
| Resistances G _____ohms__ | 100,000 |
| Resistances H _____do__ | 200,000 |
| Resistances 26, 40, 64, 74 and 80 ____do____ | 5,000 |
| Resistances 24 and 62 _____do____ | 50,000 |
| Resistance 34 _____do____ | 500,000 |
| Resistances 36 and 54 _____do____ | 100 |
| Resistance 46 _____do____ | 200,000 |
| Resistance 52 _____do____ | 500 |
| Resistances 81 and 88 _____do____ | 1,000 |
| Capacitors 32 and 42 _____microfarads__ | 0.1 |
| Capacitors 38 and 76 _____do____ | .01 |
| Capacitor 48 _____do____ | 8 |
| Capacitor 82 _____do____ | 2 |
| Tubes 50, 66, 68, 70, 84 and 86 | 5751 |

This invention is not to be limited to the exact form shown in the drawing, for obviously changes may be made within the scope of the following claims.

We claim:

1. A beacon transponder for receiving scan-modulated radar pulses and for transmitting a pair of reply pulses synchronized with each of the received radar pulses, comprising pulse receiving and demodulating means for receiving said radar pulses and for recovering the scan modulation from the received radar pulses; transmitter means; pulser means for pulsing said transmitter means to transmit a first reply pulse in response to each radar pulse received; and modulator means coupled to said demodulating means to receive said scan modulation and coupled to said transmitter means to transmit a second reply pulse delayed from the first reply pulse by an interval proportional to the scan-modulation of each radar pulse received.

2. In a beacon transponder as set forth in claim 1, amplifier means connected with said demodulating means and amplifying the output signal obtained therefrom amplitude-modulated by said scan modulation; and automatic gain control means connected to receive said output signal and coupled to the amplifier means and controlling the gain thereof to maintain the average level of the output signal constant, said output signal being coupled by said amplifier means to said modulator means.

3. In a beacon transponder as set forth in claim 2, said automatic gain control means having a long time constant, whereby the gain of the amplifier means is determined only by the strongest radar signals received during the time constant interval.

4. In a beacon transponder as set forth in claim 1, amplifier means connected with said demodulating means and amplifying the output signal therefrom; automatic gain control means coupled to said amplifier means for maintaining the average amplitude of said output signal constant; and said modulator means being coupled by said amplifier means to said demodulating means and pulse-position-modulating said transmitter means.

5. A beacon transponder for receiving scan-modulated radar pulses on one frequency and for transmitting on a different frequency reply signals synchronized with the received pulses and modulated in a mode related to the scan modulation, comprising pulse receiving and demodulating means for receiving said pulses on said one frequency and for recovering the scan modulation from the received radar pulses; transmitter means including oscillator means tuned to said different frequency; pulser means for pulsing said transmitter means in response to radar pulses received; modulator means coupled to said demodulating means to receive said scan modulation and coupled to said transmitter means for modulating its output at said scan-modulation rate, amplifier means connected with said demodulating means and amplifying the output signal therefrom; automatic gain control means coupled to said amplifier means for maintaining the average amplitude of said output signal constant; said modulator means being coupled by said amplifier means to said demodulating means and pulse-position-modulating said transmitter means, said modulator means comprising means for generating a reference potential increasing at a linear rate from the instant of receipt of each radar pulse; coincidence circuit means for comparing the amplitude of the last-received radar pulse with the amplitude of the linearly-increasing reference potential; and means actuated when a predetermined relationship between said amplitudes is reached for delivering a triggering voltage to said pulser means to pulse the transmitter means.

6. A beacon transponder for receiving scan-modulated radar pulses on one frequency and for transmitting on a different frequency pulses initiated by said radar pulses and modulated according to said scan modulation, comprising receiving and demodulating means for receiving said radar pulses on said one frequency and recovering the scan modulation therefrom; transmitter means including oscillator means tuned to said different frequency; pulser means triggered by the output from said demodulating means for pulsing said transmitter means to initiate a first reply pulse upon receipt of each radar pulse at the receiving means; and modulator means coupled to said demodulating means to receive said scan modulation and controlled thereby to trigger said pulser means to initiate a second reply pulse delayed from said first reply pulse by an interval proportional to the scan-modulation of that radar pulse initiating said first reply pulse.

7. In a beacon transponder as set forth in claim 6, amplifier means connected with said demodulating means and amplifying the output signal obtained therefrom amplitude-modulated by said scan modulation; and automatic gain control means connected to receive said output signal and coupled to the amplifier means and controlling the gain thereof to maintain the average level of the output signal constant, said output signal being coupled by said amplifier means to said modulator means.

8. In a beacon transponder as set forth in claim 7, said automatic gain control means having a long time constant, whereby the gain of the amplifier means is determined only by the strongest radar signals received during the time constant interval.

9. In a beacon transponder as set forth in claim 6, amplifier means coupling the output signal of said demodulating means with said modulator means; automatic gain control means coupled to said amplifier means for maintaining the average amplitude of said output signal constant; and said modulator means comprising means for generating a reference potential increasing at a linear rate from the instant of receipt of each radar pulse; coincidence circuit means for comparing the amplitude of the last-received radar pulse with the amplitude of the linearly increasing reference potential; and means actuated when a predetermined relationship between said amplitudes is reached for delivering a trigger voltage to said pulser means to initiate said second reply pulse.

10. In a beacon transducer as set forth in claim 6, the transmitter means being tuned to a lower frequency than the frequency to which said receiving means is tuned.

11. A beacon transponder for receiving on one frequency band radar pulses amplitude scan-modulated and for transmitting on a different frequency band pairs of pulses initiated by said radar pulses and position-modulated according to the amplitudes of said radar pulses, comprising receiving and demodulating means for receiving said radar pulses on said one frequency band and recovering the scan-modulated amplitude thereof; transmitter means including oscillator means tuned to said different frequency band; pulser means triggered by the output from said demodulating means for pulsing said transmitter means to initiate a first reply pulse upon receipt of each radar pulse at the receiving means; and delay modulator means coupled to said demodulating means to receive said scan-modulated amplitude of each radar pulse and controlled thereby to trigger said pulser means to initiate a second reply pulse delayed from said first reply pulse by an interval proportional to the scan-modulated amplitude of that radar pulse which initiated said first reply pulse.

12. In a beacon transponder as set forth in claim 11, amplifier means connected with said demodulating means and amplifying the output signal obtained therefrom amplitude-modulated by said scan modulation; and automatic gain control means connected to receive said output signal and coupled to the amplifier means and controlling the gain thereof to maintain the average level of the output signal constant, said output signal being coupled by said amplifier means to said modulator means.

13. In a beacon transponder as set forth in claim 12, said automatic gain control means having a long time constant, whereby the gain of the amplifier means is determined only by the strongest radar signals received during the time constant interval.

14. In a beacon transponder as set forth in claim 11, amplifier means coupling the output signal of said demodulating means with said modulator means; automatic gain control means coupled to said amplifier means for maintaining the average amplitude of said output signal constant; and said modulator means comprising means for generating a reference potential increasing at a linear rate from the instant of receipt of each radar pulse; coincidence circuit means for comparing the amplitude of the last-received radar pulse with the amplitude of the linearly increasing reference potential; and means actuated when a predetermined relationship between said amplitudes is reached for delivering a trigger voltage to said pulser means to initiate said second reply pulse.

15. A beacon transponder for receiving scan-modulated radar pulses and transmitting reply pulses in response thereto, comprising
pulse-receiving means,
pulse-transmitting means,
means connecting said pulse-receiving means and said pulse-transmitting means for actuating the latter to transmit a first reply pulse in response to an interrogating radar pulse, and
means connecting said pulse-receiving means and said pulse-transmitting means for actuating the latter to transmit a second reply pulse delayed from the first reply pulse by an interval proportional to the scan-modulation of said interrogating radar pulse.

16. A beacon transponder for receiving scan-modulated radar pulses and transmitting reply pulses in response thereto, comprising
pulse-receiving means,
pulse-transmitting means,
means connecting said pulse-receiving means and said pulse-transmitting means for actuating the latter to transmit a first reply pulse in response to an interrogating radar pulse, and
means connecting said pulse-receiving means and said pulse-transmitting means for actuating the latter to transmit a second reply pulse delayed from the first pulse by an interval proportional to the scan-modulation of said interrogating radar pulse,
the last means including demodulator means for recovering the modulation of the interrogating radar pulse.

17. A beacon transponder for receiving scan-modulated radar pulses and transmitting reply pulses in response thereto, comprising
pulse-receiving means,
pulse-transmitting means,
pulser means connected to said pulse-transmitting means, and
means connecting said pulse-receiving means and said pulser means for actuating the pulse-transmitting means to transmit a pair of reply pulses in response to each radar pulse received, and including circuit means for varying the interpulse period between each such pair of reply pulses proportionately to the scan-modulation of each corresponding radar pulse.

18. A beacon transponder comprising
pulse-receiving means and pulse-transmitting means,
means connected to said pulse-receiving means and to said pulse-transmitting means for actuating the latter to transmit a first reply pulse in response to reception of an interrogating pulse, and
delay means connected between said pulse-receiving means and said pulse-transmitting means for actuating the latter to transmit a second reply pulse subsequent in time to the first reply pulse by an amount proportional to the amplitude of the interrogating pulse.

19. A beacon transponder system comprising
pulse-receiving means and pulse-transmitting means,
trigger means for controlling said transmitter means,
said trigger means having two inputs, one connected to said receiver means for effecting transmission of a first reply pulse upon receipt of an interrogating pulse and the other connected to said receiver means thru delay means responsive to the amplitude of the interrogating pulse to actuate said trigger means and control said transmitter means for producing a second reply pulse delayed in time from said first reply pulse by a time proportional to the amplitude of the interrogating pulse.

20. A beacon transponder system comprising
pulse-receiving means and pulse-transmitting means,
trigger means for controlling said transmitting means and having an input from said receiving means for initiating a first reply pulse in response to reception of an interrogating pulse,
amplitude comparator means connected to said receiving means for detecting the relative amplitude of an interrogating pulse,
delay means connected between said amplitude comparator means and said trigger means to actuate said trigger means and control said transmitter means for producing a second reply pulse delayed in time from said first reply pulse by a time proportional to the amplitude of the interrogating pulse.

21. A beacon transponder system comprising
pulse-receiving means and pulse-transmitting means,
means connected to said pulse-receiving means and to said pulse-transmitting means for actuating the latter to transmit a first reply pulse in response to reception of an interrogating pulse,
rectangular wave generating means connected to said pulse-receiving means,
coincidence circuit means having two inputs, one connected to said receiving means and the other connected to said rectangular wave generating means, and having an output connected to said pulse-transmitting means to actuate the latter to transmit a second reply pulse delayed in time from said first reply pulse by a time proportional to the amplitude of the interrogating pulse.

References Cited by the Examiner
UNITED STATES PATENTS

| | | | |
|---|---|---|---|
| 2,907,999 | 10/59 | Wadley | 343—6.8 |
| 2,954,555 | 9/60 | Guttinger et al. | 343—108 X |
| 2,971,188 | 2/61 | Bryan | 343—6.8 |
| 3,015,816 | 1/62 | Morris | 343—6.8 |
| 3,035,262 | 5/62 | Vantine | 343—6.8 |
| 3,115,625 | 12/63 | Reich | 343—6.5 |

CHESTER L. JUSTUS, *Primary Examiner.*